United States Patent [19]
Carroll et al.

[11] 3,943,272
[45] Mar. 9, 1976

[54] DUAL PRESET SERVICE FITTING OR INSERT FOR UNDERFLOOR WIREWAY SYSTEMS

[75] Inventors: James C. Carroll, Hamilton; Johnny R. Curry, Oxford; George N. Jorgensen, Oxford; Frank D. King, Oxford; Gilbert A. McGoldrick, Hamilton, all of Ohio

[73] Assignee: Square D Company, Park Ridge, Ill.

[22] Filed: Mar. 5, 1975

[21] Appl. No.: 555,659

[52] U.S. Cl. .................. 174/48; 174/50; 52/221; 220/3.94
[51] Int. Cl.² .................. H02G 3/18; H02G 3/28
[58] Field of Search ............ 174/48, 49, 50, 95–98; 52/221; 220/3.3, 3.4, 3.94

[56] References Cited
UNITED STATES PATENTS

| | | | |
|---|---|---|---|
| 1,839,250 | 1/1932 | Newman et al. | 174/61 |
| 3,047,650 | 7/1962 | Reiland | 174/49 |
| 3,181,277 | 5/1965 | Slingluff | 52/221 |
| 3,303,264 | 2/1967 | Saul et al. | 174/48 |
| 3,592,956 | 7/1971 | Fork | 174/49 |
| 3,676,568 | 7/1972 | Fork | 174/49 |
| 3,864,883 | 2/1975 | McMarlin | 52/221 |

Primary Examiner—Darrell L. Clay
Attorney, Agent, or Firm—Harold J. Rathbun; Ernest S. Kettelson; Roger J. Falkowski

[57] ABSTRACT

The fitting is mountable on a cellular steel floor or deck prior to pouring of the concrete of a completed floor and comprises a separable flat base plate, a box-like housing, and a cover plate. Two self-grommeted openings in the base plate are axially aligned with respective openings of substantially equal size leading to adjacent cells of the deck, and a tab on the base plate at one of the grommeted openings interlocks with the deck to hold the base plate in position. Horizontally directed slots formed in the base plate along one longitudinal edge thereof cooperate selectively with tabs on the lower longitudinal edges of the housing to lock the housing on the base plate selectively in either of two positions. Screws or rivets may be used as additional fastening means for the base plate and housing. A longitudinally asymmetrical opening in an upper wall of the housing is closed by a filler cap prior to pouring the concrete and, after the pour, the filler cap is removed to permit the cover plate, also termed a flush floor fitting, to be installed over the opening in the upper wall. A closure member of the cover plate is turnable to expose openings for wires leading from the housing of the service fitting.

16 Claims, 14 Drawing Figures

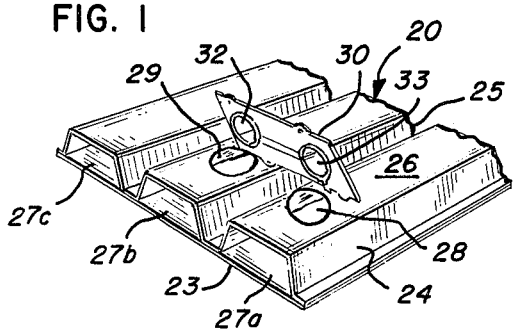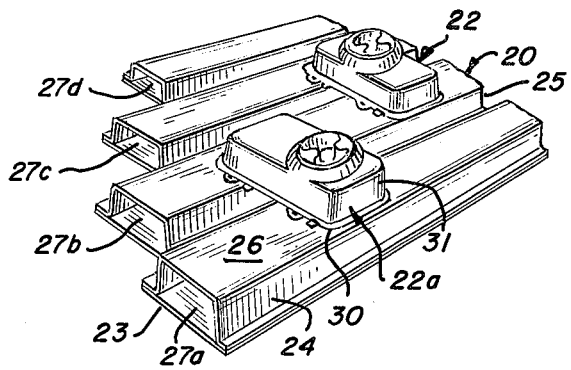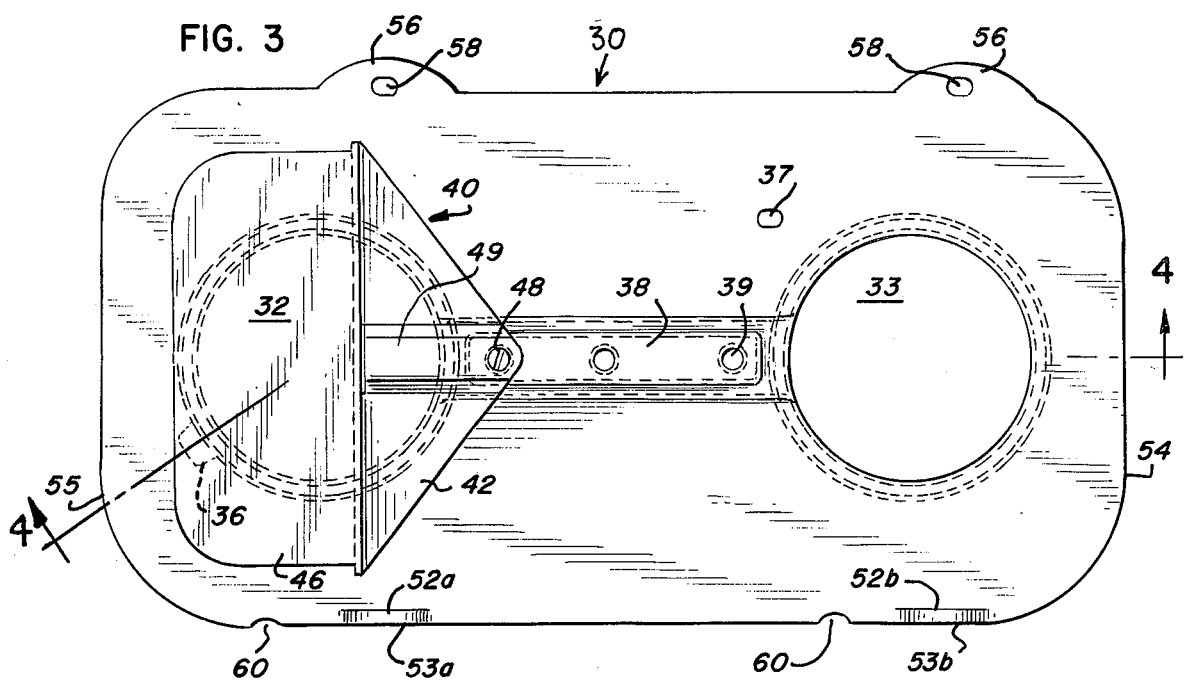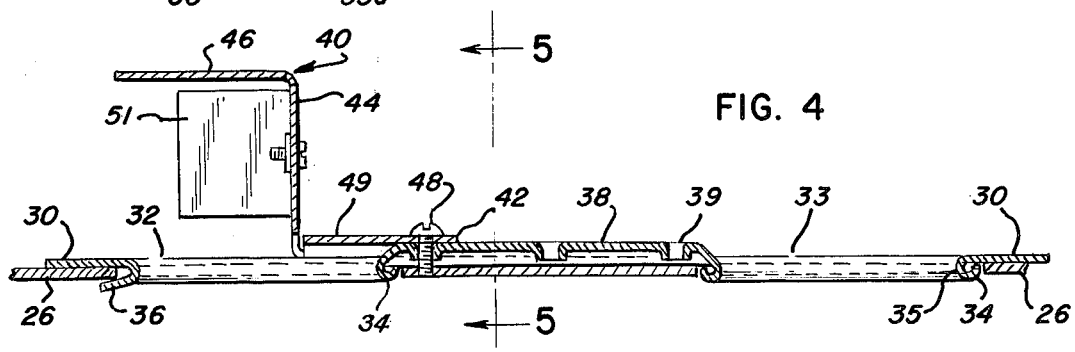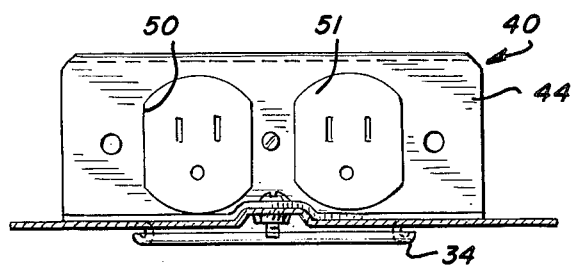

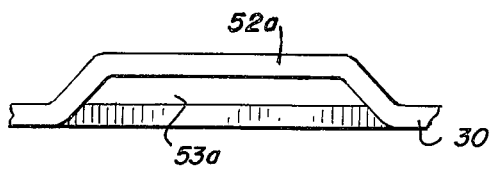
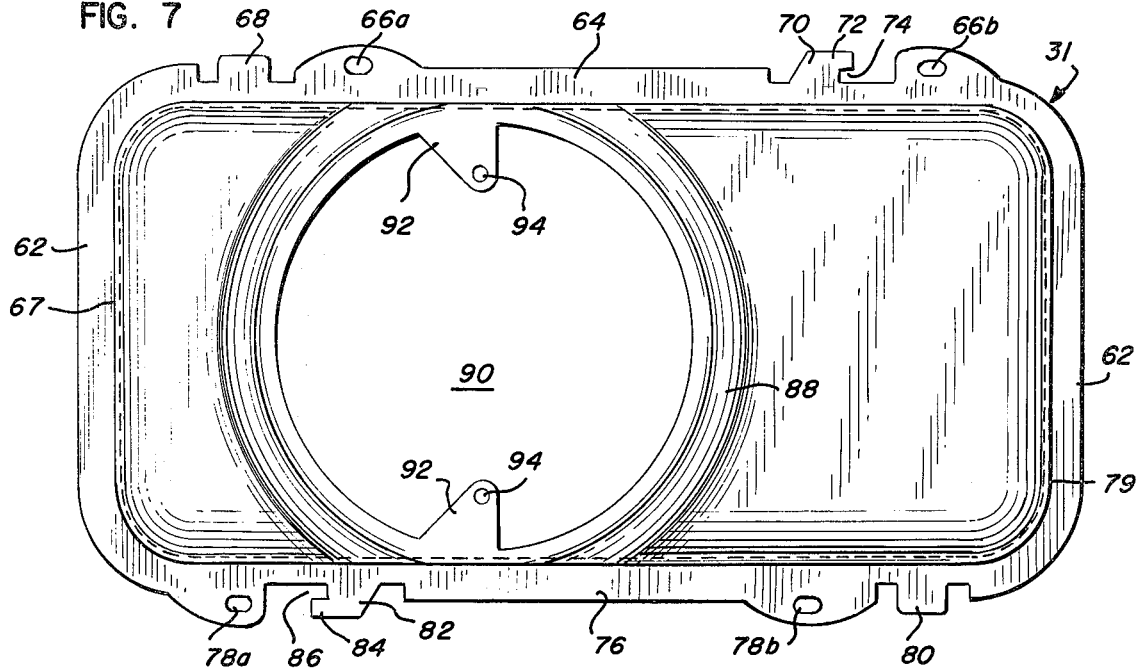
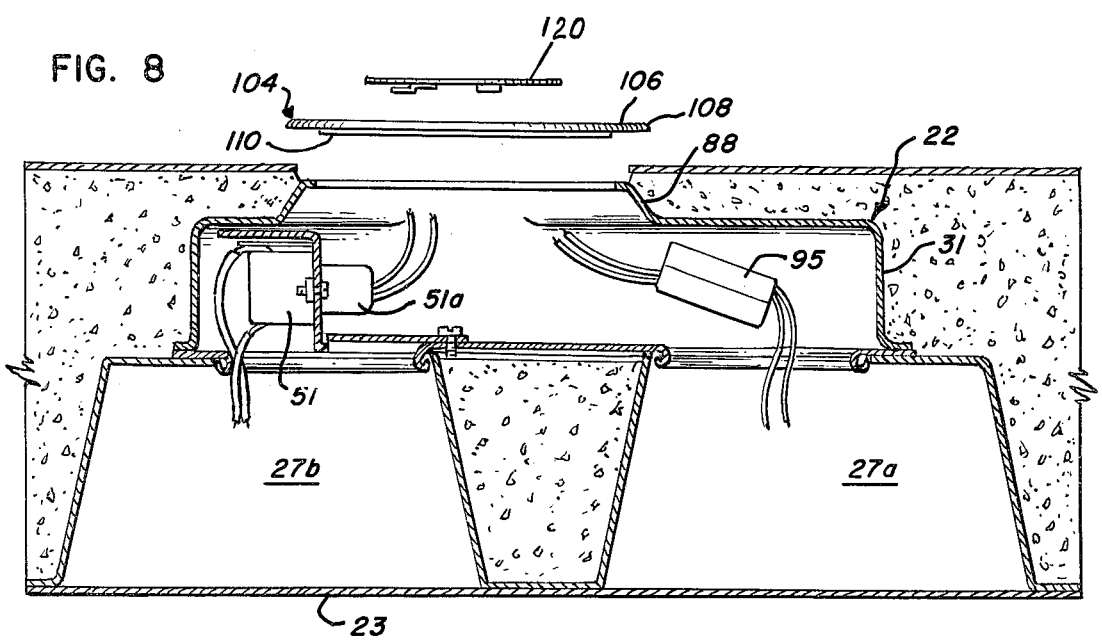

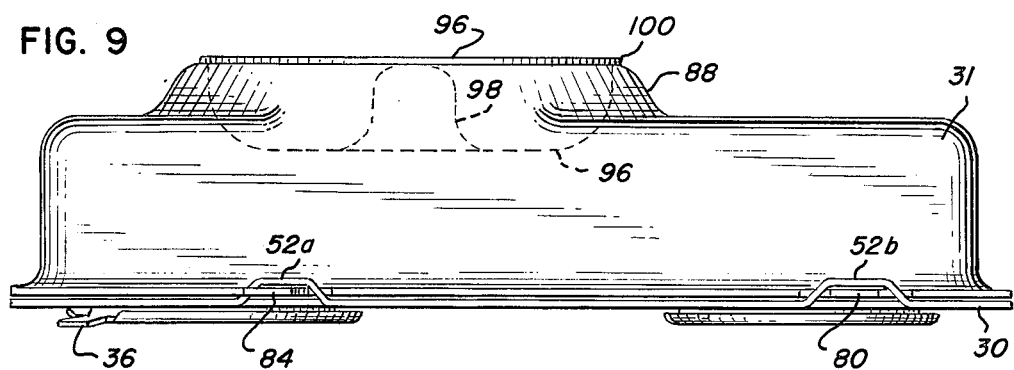
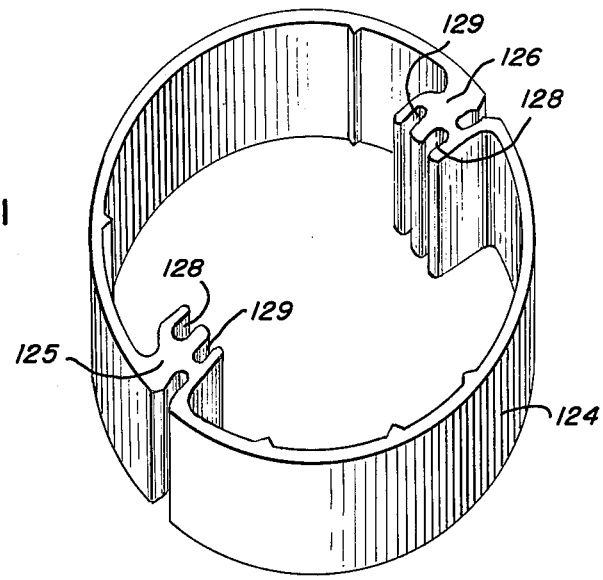
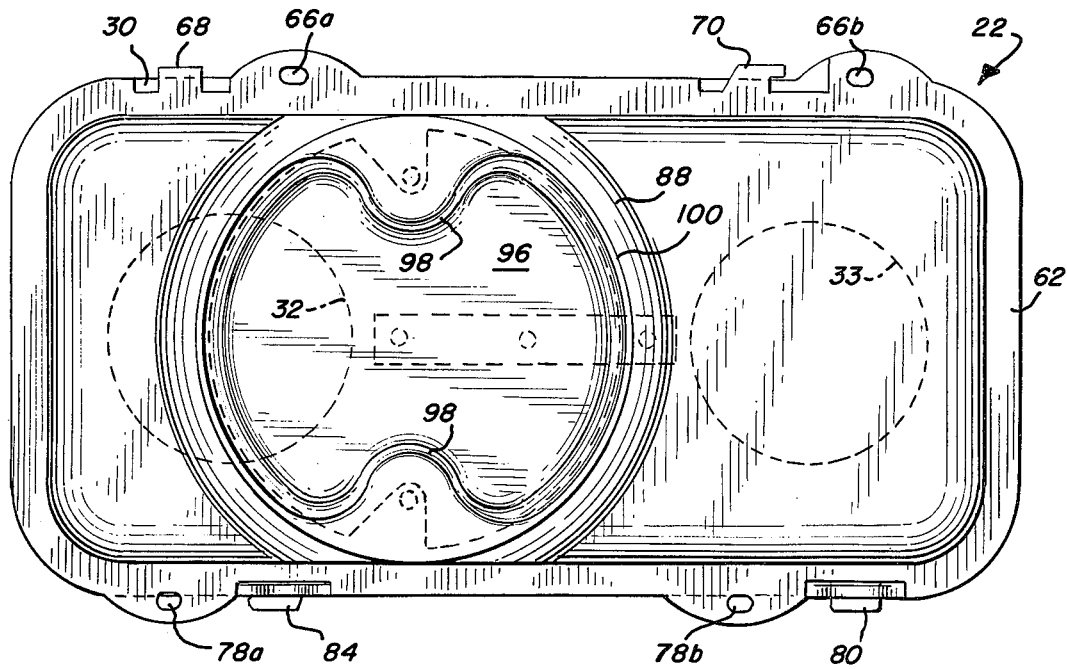

3,943,272

DUAL PRESET SERVICE FITTING OR INSERT FOR UNDERFLOOR WIREWAY SYSTEMS

BACKGROUND OF THE INVENTION

This invention relates to dual service fittings for underfloor wireway systems, and more particularly to an improved dual service fitting of the type known as a dual pre-set insert. Such a service fitting is designed to be mounted on a cellular steel floor before pouring of the concrete and bridges a pair of adjacent cells of the steel floor which respectively contain power and communication wiring. It provides for protected access to those cells.

A cellular steel floor comprises a plurality of floor sections presenting alternate parellel crests and troughs defining a plurality of elongated channels or cells providing passages for air flow, electrical power and communication wiring, piping and various other purposes. Concrete is poured over the cellular floor sections to form a completed floor except for a floor covering such as tile or carpet.

In order for a cellular steel floor to function as a viable component of the communication and electric power systems of a building, access to the cells may be provided at selected intervals. Access to the cells may be provided by either "afterset" inserts or "preset" inserts. An afterset insert is installed after the concrete has hardened by cutting a core from the concrete fill above the cellular steel floor, removing the concrete core, and then cutting a hole in the upper wall of a cell for reception of the afterset insert. In the case of a pre-set insert, an opening is formed in the upper wall of a cell prior to pouring the concrete and an insert or service fitting having a height substantially equal to the depth of the concrete pour is mounted on the cell prior to the concrete pour. After the pour, a thin layer of concrete normally overlies the insert. This layer of concrete is chipped away to provide access to the insert, and a suitable cover plate is installed on the insert.

Typically, adjacent cells of a cellular steel floor respectively contain power and communication wiring, and it is desirable that a so-called dual service fitting or insert be provided so that access to either the electric power or communication wiring or both can be provided through a single fitting.

SUMMARY OF THE INVENTION

An object of the present invention is to provide an improved dual pre-set service fitting or insert for facilitating access to adjacent cells of a cellular steel floor respectively carrying electric power and communication wiring.

A further object is to provide an improved dual pre-set insert which can be formed of sheet metal.

A further object is to provide an improved dual pre-set insert of basically two-part construction, one part being a base plate having positive locking and aligning means with openings in adjacent cells of an underfloor raceway system and the other part being a housing mountable on the base plate selectively in either of two positions.

A further object is to provide an improved dual pre-set insert having self-grommeting openings in a base plate thereof to prevent abrasion of service wires.

A further object is to provide an improved dual pre-set insert having a housing which is reversible with respect to a base plate so that the housing can be positioned as desired irrespective of the position of the base plate.

A further object is to provide a dual pre-set insert having an improved extension means to permit use of the insert with different depths of concrete.

A further object is to provide an improved dual pre-set insert including an improved cover plate or flush floor fitting which includes self-contained means for abandoning the use of the insert when electric communication and power service is no longer needed at that location.

BRIEF DESCRIPTION OF THE DRAWINGS

FIG. 1 is a fragmentary perspective view of a section of cellular steel floor with two adjacent cells having openings therein and a base plate of a dual preset service fitting or insert in accordance with this invention positioned adjacent the openings prior to mounting of the base plate on the cellular floor;

FIG. 2 is a fragmentary perspective view similar to FIG. 1 showing a pair of service fittings in accordance with this invention mounted on the cellular floor;

FIG. 3 is a top plan view of the base plate of FIG. 1 and 2 including a receptacle mounting bracket of the service fitting;

FIG. 4 is a fragmentary view, partially in section, taken generally along the line 4—4 of FIG. 3 with a top wall of a cell shown;

FIG. 5 is a view taken generally along the line 5—5 of FIG. 4;

FIG. 6 is an enlarged detail view of a portion of the base plate of the service fitting;

FIG. 7 is a top plan view of the housing of the service fittings of FIG. 2;

FIG. 8 is a view, partially exploded and partially in section, of a portion of a steel cellular floor imbedded in concrete and showing one of the service fittings of FIG. 2 with a flush floor fitting;

FIG. 9 is a side view of one of the service fittings of FIG. 2 with a temporary closure member in place;

FIG. 10 is a top plan view of the service fitting of FIG. 9;

FIG. 11 is a perspective view of an extension means which can be used with the service fitting;

DESCRIPTION OF THE PREFERRED EMBODIMENT

Figure 12:
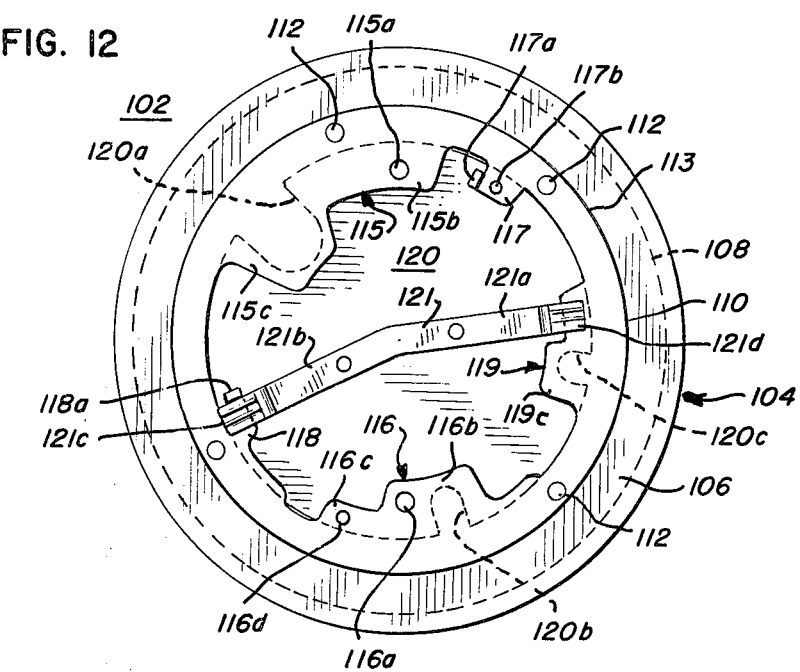
FIG. 12 is a bottom view of the flush floor fitting in its closed position.

FIGS. 1 and 2 each show a portion of a section 20 of a cellular steel floor on which dual preset service fittings or inserts 22 constructed in accordance with the present invention can be used. The section 20 of cellular floor comprises a bottom plate 23 on which is secured a top plate 24 defining a series of parallel alternating troughs 25 and crests. The crests have respective top walls 26 each of which defines, in conjunction with a pair of downwardly diverging side walls and an intervening portion of the bottom plate 23, one of a plurality of cells 27a–27d some of which may be used as raceways for electrical power or communication wiring. A wire distribution arrangement generally has power wiring in one cell and communication wiring in an adjacent cell. As shown in FIG. 1, access is provided to the adjacent cells 27a and 27b by circular openings 28 and 29 in their respective top walls 26.

As shown in FIG. 2, two longitudinally spaced identical service fittings 22 and 22a are arranged so that access to the cells 27b and 27c is provided by the fitting 22 and access to the cells 27a and 27b is provided by the fitting 22a. With this arrangement, assuming that the cell 27b contains communication wiring and the cells 27a and 27c contain power wiring, access to both communication and power wiring can be provided on opposite sides of a wall (not shown) extending upwardly from the center of the cell 27b.

The service fitting 22 comprises a substantially flat base plate 30 and a removable box-like housing 31. The base plate 30 is provided with longitudinally spaced circular openings 32 and 33 and, as indicated in FIG. 1, can be installed on the floor section 20 so that the openings 32 and 33 are either in radial alignment with the openings 29 and 28 or vice versa. The openings 32 and 33 throughout most of their peripheries have reversely bent edge portions 34 (FIG. 4) shaped to form a smooth curved inner surface 35 extending below the lower surface of the base plate 30. The openings 28 and 29 in the top walls 26 of adjacent cells such as the cells 27a and 27b are so sized that the outer peripheries of the bent over portions 34 of the openings 32–33 are snugly received therein. The curved surfaces 35 prevent abrasion of wires being drawn from either of the cells 27a and 27b for connection within the housing 31. A locking tab 36 extends radially outwardly and downwardly from the periphery of the opening 32 for reception under the peripheral edge of one or the other of the openings 28 and 29 thereby to hold the base plate 30 in a selected one of two positions on the floor section 20. Additional holding means may be provided by a screw or rivet (not shown) passing through a slot 37 in the base plate 30 into an aligned opening in the top wall 26 of one of the cells 27a or 27b.

A generally rectangular upwardly indented or raised portion 38 extends along the longitudinal centerline of the base plate 30 between the openings 32 and 33 and has three longitudinally spaced screw-receiving holes 39. A receptacle mounting bracket 40 formed of sheet metal and of generally Z-shaped configuration having a generally triangularly-shaped base portion 42, an upright portion 44, and an upper barrier portion 46 is secured to the base plate 30 by a screw 48 passing through an opening in the base portion 42 and threaded into a selected one of the openings 39. The base portion 42 has a central upwardly indented or raised portion 49 complimentary to the raised portion 38 for receiving the raised portion 38 to maintain the mounting bracket 40 against rotation about the screw 48. A pair of openings 50 is provided in the upright portion 44 for receiving the front portions of a power plug receptacle 51 carried by the portion 44. It is apparent that the mounting bracket 40 may be secured in position at any one of the holes 39 and be faced in either longitudinal direction so that the receptacle 51 may be in the most convenient position for wiring and for receiving plug connectors. Alternatively, other brackets similar to the bracket 40 may be provided for mounting other forms of connecting devices.

As shown best in FIGS. 3 and 6, the base plate 30 has a pair of narrow raised portions 52a and 52b at one longitudinal edge thereof forming respective horizontally-directed slots 53a and 53b, the slot 53b being nearer its adjacent end 54 of the base plate 30 than is the slot 53a to its adjacent end 55. The other longitudinal edge of the base plate 30 has a pair of curved wing portions 56 each having a hole 58 therethrough, the holes 58 being slightly offset from a position transversely opposite the center lines of the respective slots 53a and 53b. Adjacent each of the slots 53a and 53b is a concave cut-away portion 60.

As shown best in FIGS. 7, 8, 9 and 10, the housing 31 of the service fitting 22 is box-like and of generally rectangular configuration with rounded corners and has an outwardly directed continuous lower peripheral flange 62. Spaced apart along one longitudinal portion 64 of the flange 62 in wing-like areas is a pair of openings 66a and 66b for alignment with the respective openings 58 in the base plate 30 when the housing 31 is mounted in one turned position with respect to the base plate 30. Between the opening 66a and an adjacent end 67 of the housing 31, a pair of slots in the flange portion 64 define an outwardly directed straight tab 68, and adjacent the opening 66b a pair of slots define a locking tab 70, the locking tab 70 having a longitudinally directed ear 72 at an outer end portion thereof defining a slot 74. Spaced apart along the other longitudinal portion 76 of the flange 62 in wing-like areas is a pair of openings 78a and 78b which are in alignment with the respective openings 58 in the base plate 30 when the housing 31 is mounted in another turned position with respect to the base plate 30. Between the opening 78b and the adjacent end 79 of the housing 31, a pair of slots in the flange portion 76 define a straight tab 80, and adjacent the opening 78b a pair of slots define a locking tab 82, the tab 82 having a longitudinally directed ear 84 at its outer end portion defining a slot 86.

The upper wall of the housing 31 has an asymmetrically positioned truncated dome portion 88 having a circular opening 90 therethrough. Extending radially inwardly from the peripheral edge of the opening 90 is a pair of ears 92 each provided with a screw-receiving opening 94, the openings 94 being diametrically opposite each other.

As indicated above, the housing 31 may be mounted on the base plate 30 selectively in either of two turned positions. In one position, the locking tab 82 of the housing 31 is received in the slot 53a. During mounting, the ear 84 is entered first into the slot 53a in interlocking relation with a sloping end of the raised portion 52a defining the slot 53a received in the slot 86. The housing 31 is then slightly rotated to fully insert the straight tab 80 into the slot 53b. With the tabs 82 and 80 fully received in the slots 53a and 53b, the openings 66a and 66b in the flange portion 64 are aligned with the respective openings 58 in the base plate 30. In the other turned position, the locking tab 70 of the housing 31 is received in the slot 53a. During such mounting, the ear 72 is entered first in the slot 53a in interlocking relation with a sloping end of the raised portion 52a defining the slot 53a received in the slot 74. The housing 31 is then slightly rotated to fully insert the straight tab 68 into the slot 53b. With the tabs 70 and 68 fully received in the slots 53a and 53b, the openings 78a and 78b are aligned with the respective openings 58.

After the housing 31 is assembled on the base plate 30, screws or rivets may be inserted in one or more of the openings 66a, 66b, 78a and 78b into corresponding openings in the top walls 26 of the cell 27a and 72b to secure the fitting 22 in place. When the housing 31 is mounted on the base plate 30 in the turned position of FIGS. 9 and 10, screws or rivets received in the openings 66a and 66b pass through the holes 58 in the base plate 30, and clearance is provided by the cut-away portion 60 for the screws or rivets received in the openings 78 and 78b. When the housing 31 is mounted on the base plate 30 in the other turned position, screws or rivets received in the openings 78a and 78b pass through the opening 58 and the cut-away portions 60 provide clearance for the screws or rivets received in the openings 66a and 66b.

It is apparent that the base plate 30 may be mounted on the cellular steel floor 22 either at the factory or the job site and held in position by the tang 36 and a rivet or screw received in the slot 37. Later the housing 31 may be mounted on the base plate 30 as just described. Alternatively, the housing 31 may be assembled with the base plate 30 prior to mounting of the fitting on the floor 22.

As seen in FIG. 8, off-setting of the dome portion 88 provides adequate space for the use of Amphenol connectors 95 or the like to be used for making connections to communication wiring leading from the cell 27a. A plug 51a of an extension cord is shown plugged into the receptacle 51.

While the concrete is being poured, the opening 90 in the dome portion 88 is closed by a temporary closure member 96 as shown in FIGS. 9 and 10. The member 96 is dish shaped, is sized to fit snugly in the opening 90, and has diametrically opposed indented portions 98 for clearing the ears 92 and a narrow outwardly turned flange portion 100 which overlies the peripheral edge of the dome 88 about the opening 90.

After the concrete is poured and hardened, any concrete covering the temporary closure member 96 is chipped away and the closure member 96 is removed. Permanent closure of the opening 90 is accomplished by a cover plate 102 or flush floor fitting and forming part of the service fitting 22.

A retainer 104 of the cover plate 102 comprises an outer upper ring 106, having a beveled outer peripheral edge 108, and an inner lower ring 110, having an outer peripheral edge 113, which are riveted together as by rivets 112. The inner periphery of the upper ring 106 is circular and free of protrusions, but the inner periphery of the lower ring 110, although generally circular and aligned with the inner periphery of the upper ring 106, has five inwardly protruding portions defining shelf-like areas or shelf portions 115, 116, 117, 118 and 119.

The shelf portion 115 has an opening 115a in a narrow portion 115b thereof adjacent a wider opening-blocking portion 115c, and the shelf portion 116 has an opening 116a in a raltive wide opening-blocking portion 116b thereof adjacent a narrower portion 116c. A nib 116d is positioned on the narrow portion 116c.

The shelf portions 117 and 118 are identical and have respective downwardly directed tangs 117a and 118a at one end and respective nibs 117b and 118b. The shelf portion 119 has a nib 119a on a relatively narrow shelf portion 119b thereof and has a relatively wide adjacent hole-blocking portion 119c. The outer periphery 113 of lower ring 110 is sized to fit snugly in the opening 90 with the outer portion of the upper ring 106 overlying the peripheral edge of the dome portion 88 about the opening 90. Screws passing through the holes 115a and 116a into the openings 94 secure the retainer 104 in position on the housing 31.

A closure plate 120 of the cover plate 102 is a circular disc having a relatively large cut-out portion 120a and two relatively small cut-out portions 120b and 120c spaced about its periphery and rotatably rests on the lower ring 110. A locking cam 121 having angularly disposed portions 121a and 121b is riveted on the bottom of the cover plate 120 and extends generally diametrically with respect thereto. Downwardly off-set end portions 121c and 121d at opposite ends of the cam 121 have respective central grooves 122 for interlocking respectively with the nibs 116d and 118b and the nibs 117b and 119a.

In the closed position of the closure plate 120 shown in FIG. 12, the cut-out portions 120a, 120b, and 120c are blocked respectively by the shelf portions 115c, 116b, and 119a. The cover plate 120 is held in this position by reception of the nibs 118b and 119a in the respective grooves 122 and is held against further clockwise rotation (as viewed in FIG. 12) by engagement of the end portion 121c with the tang 118a.

Figure 13:
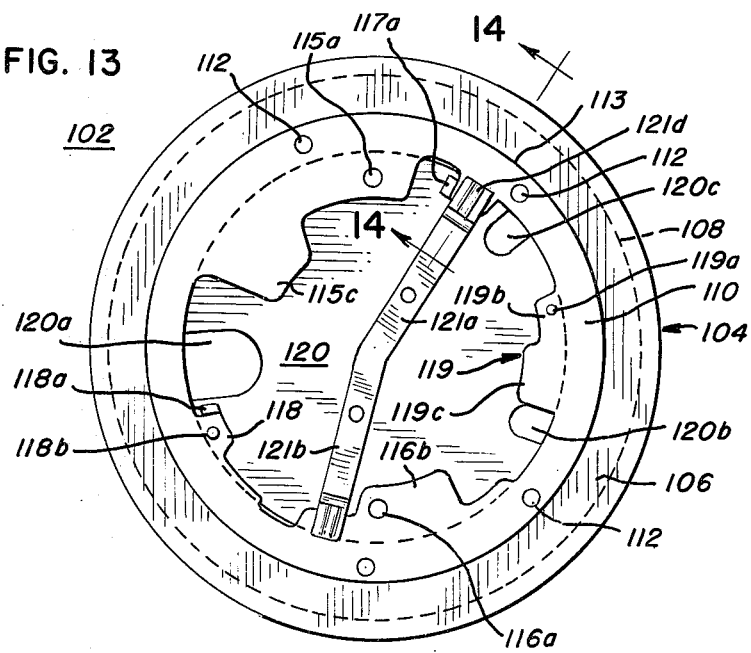
FIG. 13 is a bottom plan view of the flush floor fitting in its open position.
Figure 14:
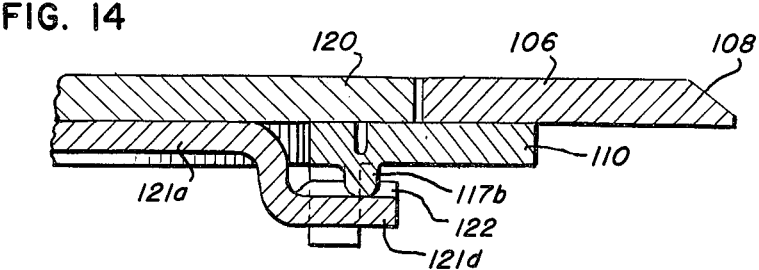
FIG. 14 is an enlarged detail view of a locking means of the flush floor fitting.

In the open position of the closure plate 120 shown in FIG. 13, the cut-out portions 120a, 120b, and 120c are exposed, so that wires may pass therethrough, and the cover plate 112 is held in that position by reception of the nibs 116d and 117b in the respective grooves 122, and is held against further counterclockwise movement (as viewed in FIG. 13) by engagement of the end portion 121d with the tang 117a.

If a thicker concrete fill than shown in FIG. 8 is provided, an extension 124 shown in FIG. 11 may be used with the fitting 22. The extension 124, which may conveniently be cut to the desired length from a suitable generally tubular aluminum extrusion, has two diametrically opposed thickened fastening portions 125 and 126 each of which has a relatively wide vertically-extending groove 128 and a relatively narrow vertically extending groove 129. The wide grooves 128 are diametrically opposed to each other and receive long screws which are threaded respectively in the openings 94 to retain the extension 124 on the dome 88 over the opening 90. The narrow grooves 129 are also diametrically opposed to each other, and self-tapping screws inserted through the openings 115a and 116a in the retainer 104 are threaded respectively into the upper ends of the narrow grooves 129 to secure the retainer 104 in position over the upper end of the extension 124.

We claim:

1. A service fitting for use with a concrete-covered cellular steel floor to provide protected access to at least one of two adjacent cells of the floor and comprising a base plate having a pair of spaced openings, means for securing the base plate to the steel floor with the openings in the base plate radially aligned with respective openings in respective top walls of adjacent cells of the floor, a box-like housing having side and top walls, interlocking means on the base plate and housing securing the housing to the base plate, an opening in the top wall of the housing, and closure means secured to the housing for selectively closing the opening in the top wall and providing access therethrough.

2. A service fitting as in claim 1 wherein the means for securing the base plate to the floor includes a tang extending downwardly and outwardly from the peripheral edge of one of the spaced openings in the base plate adapted to be received under a peripheral edge of one of the openings in adjacent cells of the floor.

3. A service fitting as in claim 1 wherein the circumferential edge portion of each of the spaced openings in the base plate is curled downwardly and outwardly to provide a smooth inner circumferential surface and an outer circumferential surface, each outer circumferential surface being sized for snug engagement with the circumferential edge face of one of the openings in the top wall of a cell of the floor.

4. A service fitting as in claim 1 wherein a bracket for mounting a power outlet receptacle is removably fastened to the base plate.

5. A service fitting as in claim 4, wherein the bracket has a mounting foot portion having an opening for a screw and the base plate has a plurality of screw-receiving openings, and the bracket being secured by a screw received selectively in any of the screw-receiving openings.

6. A service fitting as in claim 5 wherein the foot portion of the bracket has an indented portion through which the opening for a screw extends, and the plurality of screw-receiving openings in the base plate are longitudinally spaced along a raised area of the base plate complementary to and received in the indented portion.

7. A service fitting as in claim 1 wherein the interlocking means comprises at least one horizontally directed slot at an edge portion of the base plate and a complementary tang on a bottom flange portion of the housing removably received in the slot.

8. A service fitting as in claim 1 wherein the interlocking means comprises a pair of longitudinally spaced horizontally directed slots at one longitudinal edge portion of the base plate and a first pair of complementary tangs spaced longitudinally along one longitudinal bottom edge of the housing removably received in the slots, respectively.

9. A service fitting as in claim 8 wherein the interlocking means comprises a second pair of tangs spaced longitudinally along the other longitudinal bottom edge of the housing and removably received in the slots, respectively.

10. A service fitting as in claim 9 wherein there is an opening in the top wall of the housing which is spaced nearer one end of the housing than the other, and the tangs of the housing and the slots of the base are so positioned that the housing may be positioned selectively in either of two positions with respect to the base, in one position the first pair of the tangs being received in the slots and, in the other position, the second pair of tangs being received in the slots.

11. A service fitting as in claim 1 wherein the closure means comprises a retainer secured to the housing about the opening and a circular disk rotatably mounted in the retainer for rotation between two positions.

12. A service fitting as in claim 11 wherein the disk has a plurality of cut-out portions at spaced locations about its periphery and the retainer includes shelf portions that block the respective cut-out portions in one position of the disk and do not block the cut-out portions in the other turned position.

13. A service fitting as in claim 12 wherein a locking cam is secured to the under side of the disk and has a plurality of locking means positioned adjacent the periphery of the disk at spaced locations, complementary locking means are on the retainer, and said locking means cooperating to releasably retain the disk selectively in one of its two positions.

14. A service fitting for use with a concrete-covered cellular steel floor to provide protected access to at least one of two adjacent cells of the floor and comprising a box-like housing having side and top walls, means for securing the housing to the floor, an opening in the top wall of the housing, and closure means closing the opening in the top wall, the closure means comprising a retainer secured to the housing about the opening and a circular disk rotatably mounted in the retainer for rotation between two positions, the disk having a plurality of cut-out portions as spaced locations about its periphery, and the retainer including shelf portions that block the respective cut-out portions in one position of the disk and do not block the cut-out portions in the other turned position.

15. A service fitting as in claim 14 wherein a locking cam is secured to the under side of the disk having a plurality of locking means, complementary locking means are on the retainer, said locking means cooperating to releasably retain the disk selectively in one of its two positions.

16. A service fitting for use with concrete-covered cellular steel floor to provide protected access to at least one of two adjacent cells of the floor and comprising a base plate having a pair of spaced openings, a tang extending downwardly and outwardly from the peripheral edge of one of the spaced openings in the base plate for securing the base plate to the steel floor with the openings in the base plate radially aligned with respective openings in respective top walls of adjacent cells of the floor, the circumferential edge portion of each of the spaced openings in the base plate being curled downwardly and outwardly providing a smooth inner circumferential surface and an outer circumferential surface, each of the outer circumferential surfaces being sized for snug engagement with the circumferential edge faces of the openings in the top walls of the cells of the floor, a box-like housing having side walls and a top wall, interlocking means comprising at least one horizontally directed slot at an edge portion of the base place and a complementary tang at a lower edge of a side wall of the housing removably received in the slot removably securing the housing to the base plate, an opening in the top wall of the housing, and closure means secured to the housing for selectively closing the opening in the top wall and providing access therethrough, the closure means including a retainer secured to the housing about the opening and a circular disk rotatably mounted in the retainer for rotation between two positions, the disk having openings therein that are blocked by respective barrier portions of the retainer when the disk is in one of the two positions and exposed to the interior of the housing when the disk is in the other turned position to provide said access.

* * * * *